United States Patent [19]
Ellington

[11] Patent Number: 6,029,872
[45] Date of Patent: Feb. 29, 2000

[54] LIGHT SPINNING ROD HOLSTER

[76] Inventor: Charles E. Ellington, 128 Mount Vernon Dr., Wilmington, N.C. 28403

[21] Appl. No.: 09/159,973

[22] Filed: Sep. 24, 1998

[51] Int. Cl.[7] ............................... A45F 5/00; A01K 97/10
[52] U.S. Cl. ..................... 224/251; 224/661; 224/677; 224/678; 224/922; 43/21.2
[58] Field of Search ..................... 224/660, 661, 224/922, 251, 200, 665, 666, 269, 920; 43/21.2; D3/221

[56] References Cited

U.S. PATENT DOCUMENTS

| | | |
|---|---|---|
| 2,781,958 | 2/1957 | Lewandowski . |
| 2,954,909 | 10/1960 | Miller et al. . |
| 3,154,274 | 10/1964 | Hillcourt ................................. 43/21.2 |
| 3,874,573 | 4/1975 | Fruscella et al. . |
| 4,103,807 | 8/1978 | Lyon et al. ........................... 224/661 X |
| 4,569,466 | 2/1986 | Webber . |
| 4,871,099 | 10/1989 | Bogar, Jr. ............................. 224/922 X |
| 5,044,109 | 9/1991 | Fast ..................................... 224/922 X |
| 5,052,603 | 10/1991 | Spina ................................... 224/661 X |
| 5,076,478 | 12/1991 | Unger . |
| 5,123,578 | 6/1992 | Morse ..................................... 224/151 |
| 5,302,302 | 4/1994 | Shelley et al. . |
| 5,386,932 | 2/1995 | Gross ..................................... 224/200 |
| 5,445,303 | 8/1995 | Cawile, Jr. ........................... 224/661 X |
| 5,449,104 | 9/1995 | Parsons et al. ......................... 224/245 |
| 5,465,889 | 11/1995 | Smith ..................................... 224/224 |
| 5,511,336 | 4/1996 | Bishop .................................... 43/21.2 |
| 5,813,162 | 9/1998 | Tse et al. ............................. 224/922 X |
| 5,826,762 | 10/1998 | Dellinger ............................. 224/251 X |

Primary Examiner—Gregory M. Vidovich
Attorney, Agent, or Firm—Michael E. Mauney

[57] ABSTRACT

A light spinning rod holster that mounts to the waistband of a user's swimsuit. It is constructed of lightweight corrosion-resistent plastic. At one end of the light spinning rod holster, the plastic is folded into a clip shape, which secures the light spinning rod holster to the waistband of a swimsuit. Disposed along the length of the light spinning rod holster is a tubular rod holder open at each end with a slot to secure a spinning rod into place in the tubular rod holder. An adjustable belt affixed to the bottom of the light spinning rod holster holds it in place against the thigh of a user and helps support some of the weight of the device and any spinning rod fixed therein.

3 Claims, 4 Drawing Sheets

LIGHT SPINNING ROD HOLSTER

FIELD OF THE INVENTION

This Application relates generally to carrying devices for fishing rods to be used while the rods are in use and, more particularly, to a cylinder-like holster construction for a spinning rod worn by the fisherman while the rod is in use.

BACKGROUND OF THE INVENTION

Numerous devices have been proposed to free a fisherman's hands while fishing and to relieve him of the need of always holding the rod in one or the other hand. This type of device is useful even when a fisherman is in a boat, on a pier, or on some other structure where it may be possible to lay the rod down. However, it is particularly useful for a fisherman who is standing in water either while wading for fly fishing or surf casting along the shore.

For example, the E. A. Lewandowski, U.S. Pat. No. 2,781,958 discloses a belt-mounted circular rod holder that has an arc-like support piece with belt loops and a tubular-like second piece to mount to the support piece. Provision is made not only for the receipt of the butt or handle of the fishing rod, but also of portions of the fishing rod when broken down into its respective pieces for transportation or easier handling. An elastic cord is used to secure the pieces of the fishing rod in place when the rod is broken down into its respective pieces.

Gross, U.S. Pat. No. 5,386,982 shows a self-tightening, belt-attached fishing rod holder. Here, the rod is placed in a sleeve of flexible material open at the top. The weight of the fishing rod causes a coil affixed at the top of the flexible sleeve to tighten to hold the fishing rod in place.

Webber, U.S. Pat. No. 4,569,466, discloses a fishing rod holster that uses rigid U-shaped support pieces mounted against a flat base supported by a belt around the waist of the fisherman. The fishing rod is placed between the two U-shaped pieces and held in place by gravity.

Bishop, U.S. Pat. No. 5,511,336, discloses a fishing rod holder with a hip plate of thin flexible plastic. The rod is held in place by a tubular housing, which is slidably detachable from the hip plate hence, can be adjusted to hold different kinds of fishing rods. The flat cylindrical plate is held against the waist of the fisherman by slots for receipt of a belt to go around the waist of a fisherman. The tubular support piece for the rod is adjusted to angle the rod away from the fisherman to facilitate handling and safety.

There are a variety of other inventions that hold specialized tools that may be used in other applications. One example of that is seen in Shelley et al, U.S. Pat. No. 5,302,302, which discloses a tubular belt-mounted holster device for holding an aerosol can or such similar instrument that may be carried on the body of a person at the waist. The tubular support sleeve is tapered somewhat, so that an aerosol can may be dropped into the tube, where it will drop until the diameter of the tube is no greater than the diameter of the can, where it will be held in place by frictional fit. Unger, U.S. Pat. No. 5,076,478, discloses a device to be used by window washers, which has a reservoir for water as well as a slot mounted outside of but contiguous with the water reservoir for receipt of the window washing tool.

Despite all the above work many of the proposed devices have proven impractical when in use. First, a rod holder that is designed for a fly rod ordinarily will not work well with a casting rod or with a spinning rod. Likewise, a rod designed for casting or spinning will not work well with a fly rod and so on. Moreover fishing rods vary widely in weight and purpose, ranging from very small lightweight spinning outfits to very heavy spinning or casting rods that might be used in casting for large game fish weighing upwards of 100 pounds like tarpon or red sea bass. A rod holder that would work well for one type of rod will either be too light or too heavy for use with the other type of rod.

Nowadays, the recreational fisherman, especially the occasional fisherman who may only fish a few times a year at a lake or shore, uses a lightweight spinning outfit. This requires less skill and practice than does either a casting rod or fly rod. Oftentimes, such a person will employ the rod, especially on the ocean, while wearing a bathing suit or such similar clothing that will allow them to wade into the water a certain distance in order to optimize the cast of their bait or lure into deeper water behind the breaking waves, commonly called the slough. People doing this kind of surf casting using light spinning rods will usually not have a belt to secure a rod holder. Moreover, the bathing suit itself is ordinarily held into place by elastic with perhaps a tied drawstring and can easily be pulled out of place by a heavy fishing rod holder and fishing rod carried within that holder. Because nothing is worn under a bathing suit, a rod holder that pulls down a bathing suit is impractical.

None of the extant fishing rod holders known to this inventor are suitable for use with a lightweight spinning rod to be held in place by a bathing suit or other lightweight apparel that is ordinarily not equipped with a belt. It is the object of the current invention to provide a lightweight, corrosion resistant rod holder to attach by a clip to swimming trunks or other apparel not ordinarily equipped with a belt. It is designed to be easily attached and removed from the waist of the wearer. It is designed to secure a lightweight spinning rod in place to allow the user to re-bait his hook, to change hooks or lures, or to effect small repairs to the rod without ever leaving the water. It is a further object of this invention to be simple in construction and foolproof in use, to have no moving parts, and to be designed for comfortable longtime wear.

SUMMARY OF THE INVENTION

This invention is made of lightweight, corrosion resistant plastic. It will ordinarily be constructed of a molded plastic material. It is designed to be light enough in weight not to require an auxiliary hip plate or other load-spreading device to be worn on or near the waist of the wearer. On one end of the device there is a clip which will slide around the waistband of swimming trunks or trousers of the user, which secures the device in place around the waistband of the swimming trunks or trousers of the user. A vertical piece extends downwardly from the securing clip where a tubular fishing rod support tube is mounted. The rod support tube is made of lightweight plastic with a flared outward lip and an angled slot where the support arm for a spinning reel will slide into place. The entry to the slot is angled so that a user need not precisely mount the rod in order for it to be appropriately oriented in the holster when in use. Once the rod is placed into the holster and the support arm of the spinning reel is properly oriented in the slot, the rod will be lowered into place until the reel support arm rests against the bottom of the slot where it is held in place by gravity and by friction. The bottom of the tubular rod support is open to allow handles of varying lengths to readily fit within the support tube. Below the tubular rod support, the vertical plastic piece extends downwardly terminating in a loop where a belt of securing material is passed. This belt will ordinarily be made of flat woven material with Velcro™ tape. This belt fits around the thigh of the user and is secured into place by the Velcro™. However, any kind of pliable cord would serve as well. This belt serves to keep the vertical plastic piece flat against the leg of the user, but also serves to carry some of the weight of both the fishing rod holster and of the fishing rod mounted within the holster.

DETAILED DESCRIPTION OF THE DRAWINGS

Figure 1:
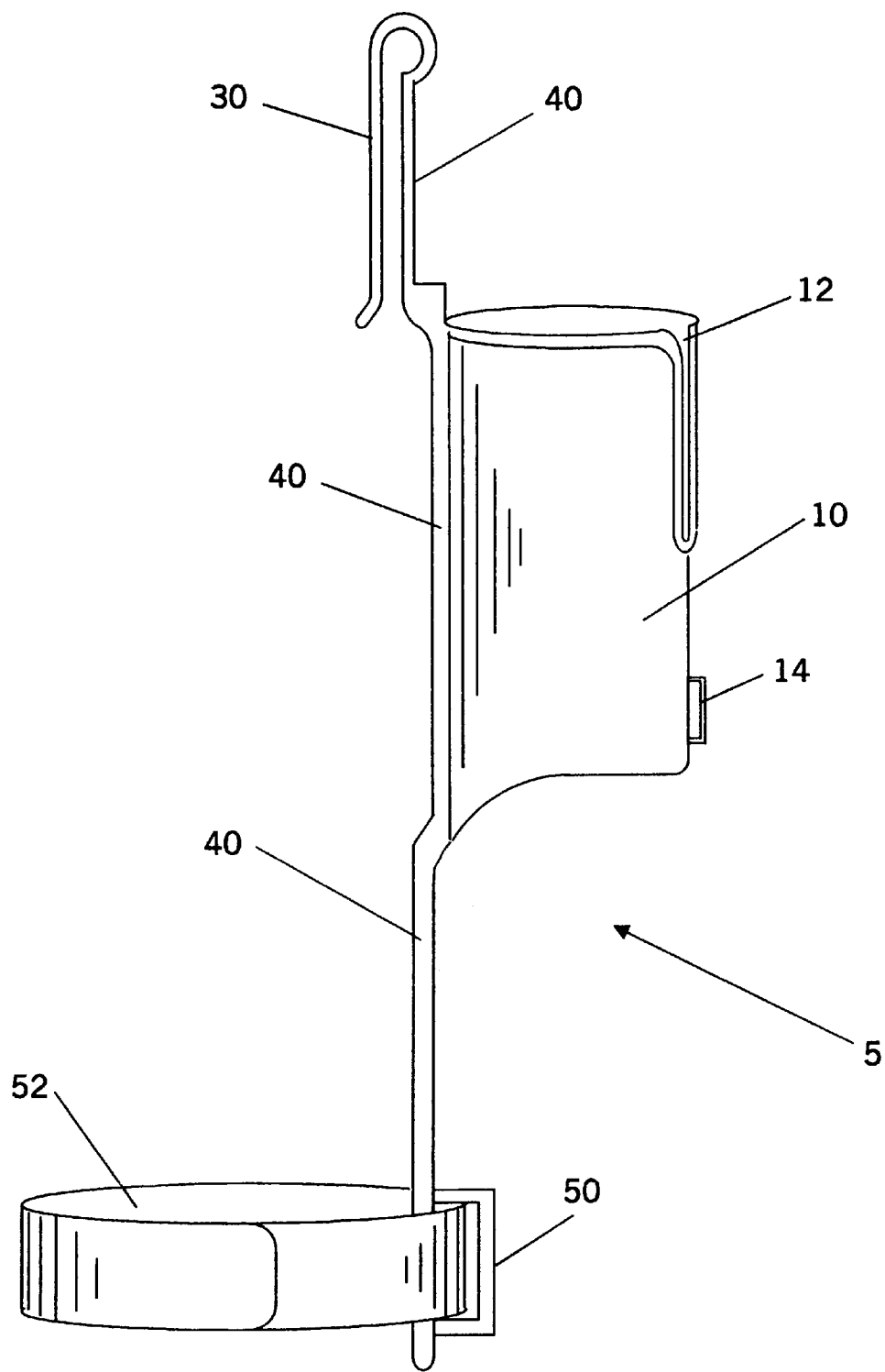
FIG. 1 shows the current invention seen from the side.

FIG. 1 shows the current light spinning rod holster (5) as seen from the side. There is a rigid vertical strap (40) ordinarily, approximately one-eighth of an inch thick, approximately one inch and a quarter wide, and approximately fifteen inches long. One end of the vertical strap (40) is folded over to form an attachment clip (30). This clips around the waistband or belt of the user to secure the light spinning rod holster (5) into place when in use. Disposed at the opposite end of the vertical strap (40) is abelt loop (50). Disposed within that belt loop is a belt (52). Ordinarily, this belt (52) will have disposed on it the miniature hook-and-eye attachment means known by the trade name of Velcro™. This belt (52) will fit around the upper leg or thigh of the user and adjustably fit into place by means of the miniature hook-and-eye attachment means. This serves the dual purpose of holding the light spinning rod holster (5) into place but also providing some support for the weight of the light spinning rod holster (5) and any fishing rod that may be resting therein. Disposed along the lengthwise dimension of the vertical strap (40) is a tubular rod holder (10) open at both ends. This tubular rod holder (10) is approximately two inches in diameter and five inches in length. There is a slot (12) (seen more clearly in FIG. 2) cut into the face of the tubular rod holder (10). At the bottom of the tubular rod holder (10) is a hook loop (14). A spinning reel (shown in FIGS. 3 and 4) attaches to the spinning rod by an angled piece of metal. This angled piece of metal will allow the butt of the spinning rod to slide within the tubular rod holder (10) with the angled piece of metal fitting into the slot (12). The fishing rod and spinning reel will therefore be secured in place inside the tubular rod holder (10) by gravity. The clip (30) goes over the waistband of the trousers or swim suit of the user so that the waistband or belt of the user will be secured inside of the space created by the folded U-shape of the clip (30) holding the light spinning rod holster (5) into place by gravity and supported by waistband of the swimsuit or trousers of the user and the belt (52). The light spinning rod holder (5) should weigh less than four ounces. Ideally, it should be used with a lightweight spinning rod so that the combined weight of the light spinning rod holder (5) and its associated spinning rod will not displace a swimsuit or other article of clothing that is supporting the light spinning rod holder and the spinning rod placed therein. The light spinning rod holder may be attached to a belt or the user may choose to wear a dedicated belt specifically for the purpose of holding it in place. However, by minimizing the weight of the light spinning rod holder (5), this invention gives the user the option of using it while wearing swimming trunks and without employing a belt. This is achieved by the lightweight plastic construction of the light spinning rod holder (5) and the belt loop (50) and the belt (52).

Figure 2:
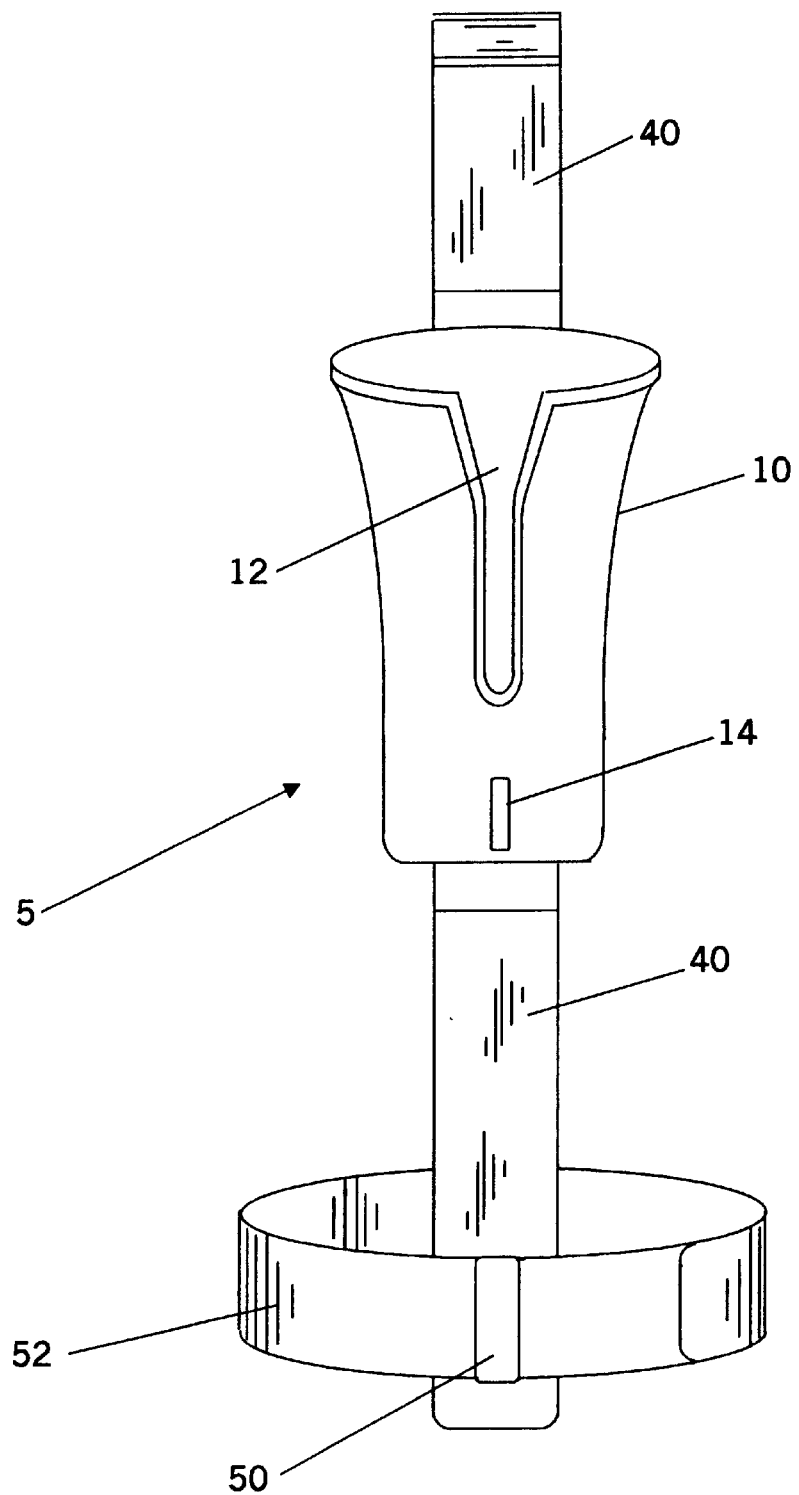
FIG. 2 shows the current invention seen from the front.

FIG. 2 shows the light spinning rod holder (5) as seen from the front. The clip (30) is not shown in this view, but rather is concealed around and behind of the upper portion of the vertical strap (40). Seen more clearly is the angled slot (12) in the tubular rod holder (10). The slot (12) is wider at the top and narrows to the bottom. The wider opening at the top of the slot (12) makes it easier to insert the fishing rod while the narrower slot (12) at the bottom holds the fishing rod more securely. Disposed at the bottom of the tubular rod holder (10) is a hook loop (14). This will allow the user to attach a hook at the end of the fishing line on the fishing rod so that it will not be waving around in the air creating a hazard to the user or nearby people. This hook loop (14) could also be used to secure such things as a knife or multi-purpose tool to the side of the tubular rod holder (10) where it would be conveniently available to the user to cut bait, to extract a hook for a fish's mouth, or to perform such other tasks as a fisherman is called on to do during the course of performing the sport of fishing. The size and dimensions of the light spinning rod holder (5) are important for its proper functioning. Although some variation is allowed, if the device is made too large, it will become too heavy to be held around the waistband of a pair of swimming trunks. If it is too small and too light, it will not adequately secure even a light spinning rod into place. The light spinning rod holder (5) must be constructed of appropriate lightweight corrosion-resistant material. A number of plastics are suitable for this purpose, including various types of polyethylene and polystyrene.

Figure 3:
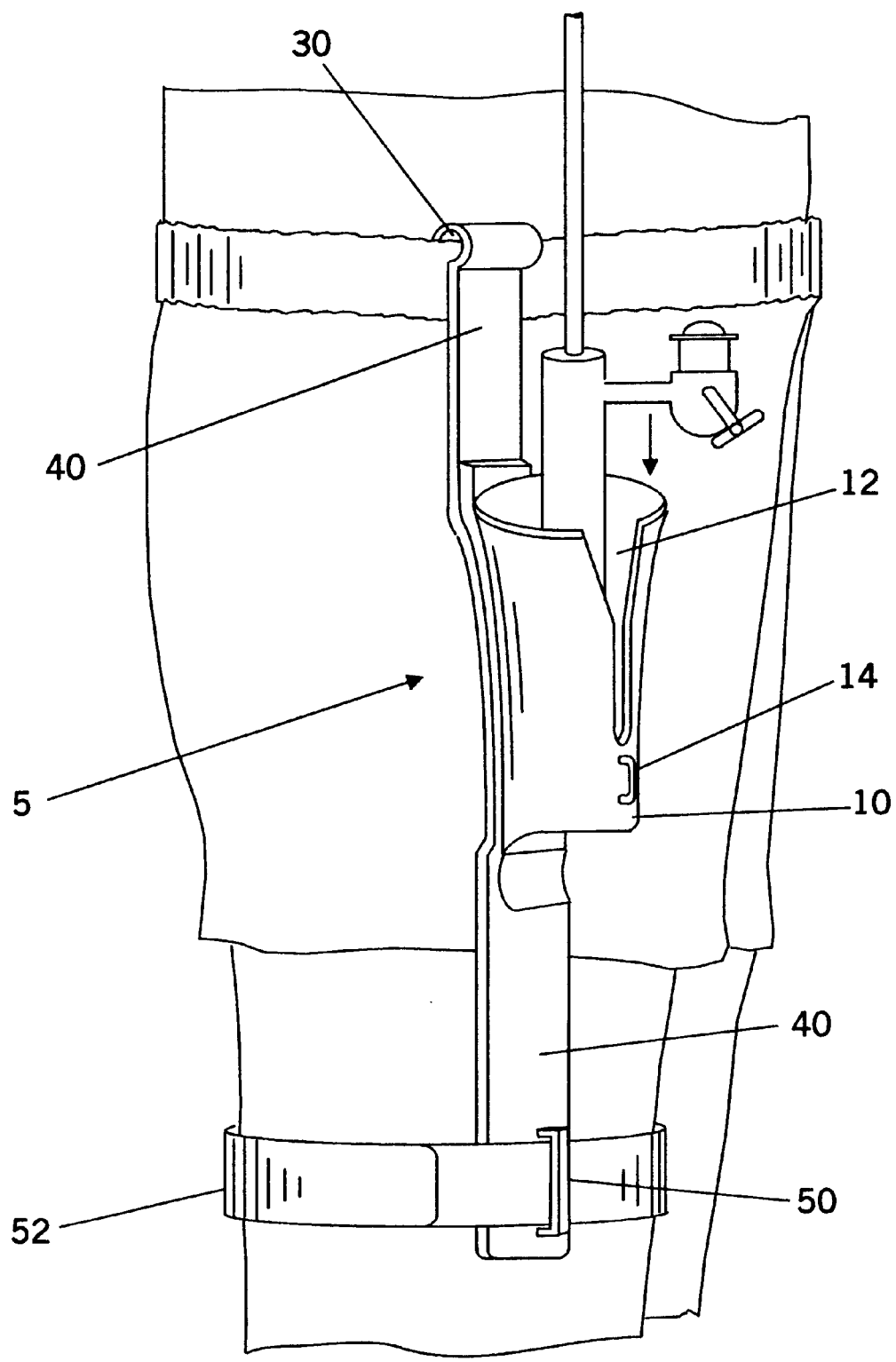
FIG. 3 shows the current invention mounted on the waist of the user with a fishing rod being inserted into place into the current invention.

FIG. 3 shows the light spinning rod holder (5) in place around the waistband of the swimming trunks of a user. The belt (52) passes through the belt loop (50) and secures the lower end of the vertical strap (40) to the thigh of the user. The clip (30) is shown partially around the waist of the user with one portion of it concealed behind the swim trunks of the user. A light spinning rod is shown positioned above the tubular rod holder (10) and in the process of being inserted downward into the tubular rod holder where it will rest by gravity at the bottom of the slot (12). As can be seen form this figure, the metal piece that connects the spinning reel to the spinning rod serves to secure the spinning rod and reel in place in the tubular rod holder. Other types of fishing rods and reels will not work in this tubular rod holder nearly as well. A spinning rod functions by use of a bail where the line freely uncoils from a spool. This requires that the spool of fishing line be affixed some distance from the rod to avoid tangles. There also must be room for the bail to be pulled back from the line spool into an open position, then to be closed when the line is retrieved and rewound around the spool. This is in contrast to either a fly rod or casting rod where the reel is secured directly to the rod without the intervening metal piece necessary to distance the spinning reel and its operation from the rod. It is this metal piece that the slot (12) is particularly designed to receive. Although other types of reels can be held in the light spinning rod holder, it is specifically designed for a light spinning rod where the user is apt to, at least part of the time, be in water requiring him to wear swimming apparel.

Figure 4:
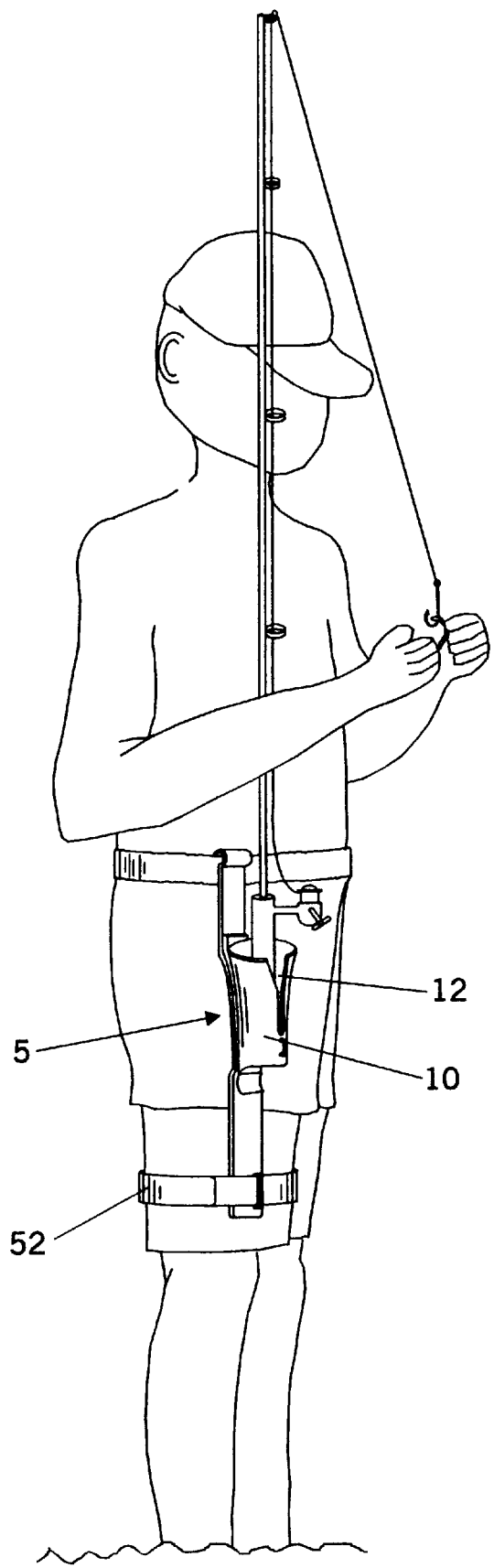
FIG. 4 shows the current invention with a light spinning rod fitted into place freeing the hands of the user.

FIG. 4 shows the current invention in use around the waist of the user. The light spinning rod holder (5) is attached to the waist of the user by the clip (30) (not shown). A spinning rod rests in the tubular rod holder (10) where gravity supports it in place inside the slot (12). It is held both against the side of the user and partially in place by the belt (52). As can be seen from FIG. 4, the light spinning rod holder (5)

holds a spinning rod securely in place freeing the hands of the user seen here baiting a hook.

The foregoing description of the preferred embodiment is for illustration only. Variations within this design are permitted that do not depart from the overall conception of the inventor. The only limitations are in the claims which follow.

I claim:

1. A lightweight spinning rod holster to be worn at the waist of the user comprising:

(a) a corrosion resistant elongated plastic piece;

(b) at a first end of said elongated plastic piece means for attaching said elongated plastic piece to an article of clothing worn around a user's waist;

(c) at a second end of said elongated plastic piece an adjustable woven fabric piece support band with miniature hook-and-eye pieces disposed along a portion of said woven fabric piece support band whereby said woven fabric piece support band may be adjustably fitted to various sizes of user's thighs and said elongated plastic piece is securable to and partially supportable by a thigh of the user;

(d) a hollow tubular spinning rod holder open at both ends attached to said elongated plastic piece, said rod holder having a rounded slot cut into a lengthwise dimension of said tubular spinning rod holder and a loop disposed on an outer surface of said tubular spinning rod holder below said rounded slot and collinear with said slot whereby a lightweight fishing rod may be easily secured in said tubular spinning rod holder and a hook is securable to said loop; and, (e) said tubular spinning rod holder and said elongated plastic piece are constructed of one piece of plastic weighing less than four ounces.

2. A lightweight spinning rod holster to be worn at the waist of the user of claim 1 wherein said means for attaching comprising a clip.

3. A lightweight spinning rod holster to be worn at the waist of the user of claim 1 wherein said support band is secured to said second end of said elongated plastic piece by means of a loop.

* * * * *